Nov. 17, 1953 G. M. JONES 2,659,403
FOOD MASHER
Filed Nov. 8, 1950

INVENTOR.
George M. Jones
BY
Leonard L. Kalish
ATTORNEY

Patented Nov. 17, 1953

2,659,403

UNITED STATES PATENT OFFICE 2,659,403

FOOD MASHER

George M. Jones, Jenkintown, Pa.

Application November 8, 1950, Serial No. 194,639

2 Claims. (Cl. 146—213)

The present invention relates to a new and improved kitchen utensil for pulverizing foodproducts.

The present invention has particular reference to a potato creamer or potato masher or the like.

An object of the present invention is to provide a kitchen utensil for creaming potatoes or like foods which smoothly and evenly pulverizes the food.

Another object of the present invention is to provide a potato creamer or masher which spreads the mashed potatoes toward the periphery of the utensil.

Still another object of the present invention is to provide a potato creamer adapted to prevent the pulverized or mashed or creamed potatoes from piling up on top of the instrument as it is being used.

Further objects will be apparent by reference to the appended specification, claims and drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the accompanying drawings wherein like reference characters indicate like parts:

The potato creamer 10 includes a head 11 secured by a yoke 12 to a handle 13, as by welding, riveting or the like.

Figure 1:
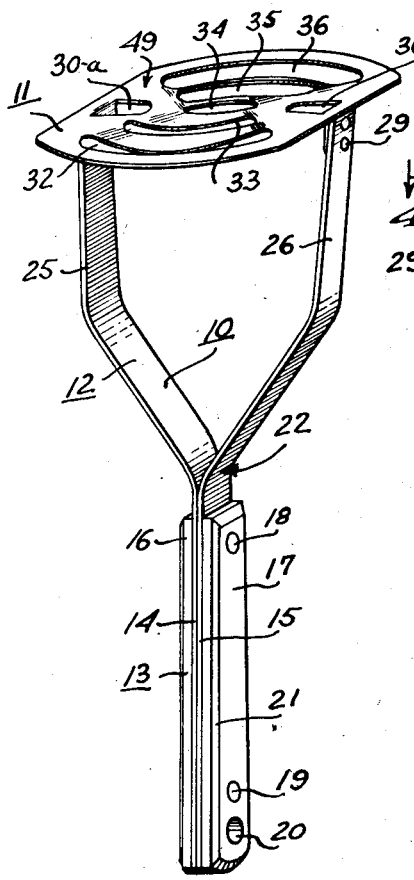
Figure 1 represents a perspective view of the potato creamer of the present invention.
Figures 2, 3:
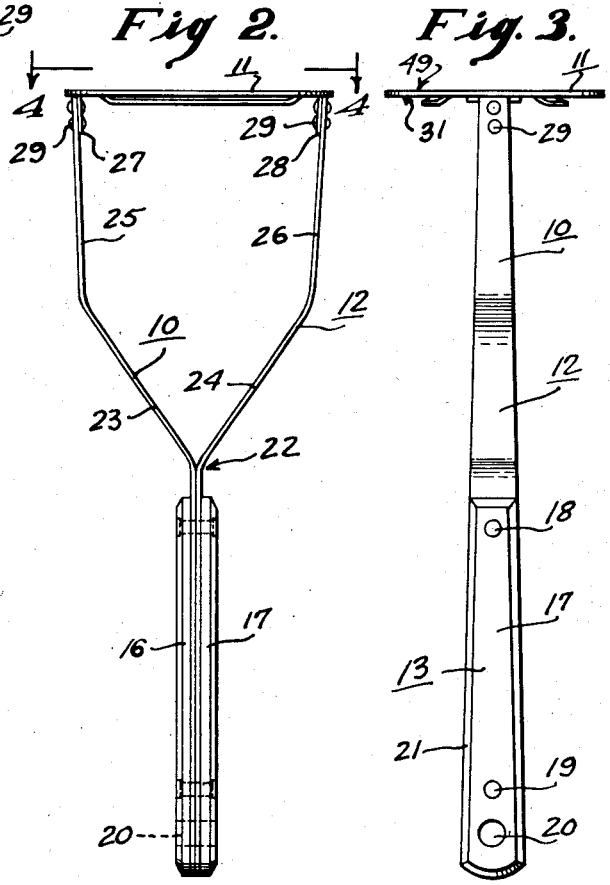
Figure 2 represents a front elevational view of the potato creamer of Figure 1.
Figure 3 represents a side elevational view of the potato creamer shown in Figures 1 and 2.
Figure 4:
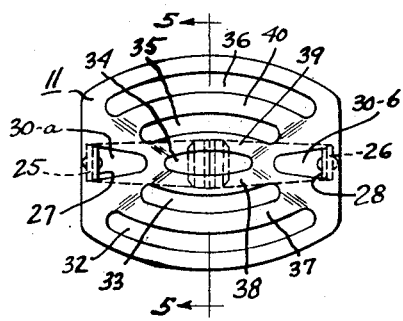
Figure 4 represents an end elevational view of the potato creamer shown in Figures 1 to 3, inclusive, viewed generally along line 4—4 of Figure 2.

The handle 13 includes the tangs 14 and 15 which are extensions of the yoke 12, on each side of which are the handle-grips 16 and 17. Handle-fastening means 18 and 19 pass through aligned holes in the tangs 14 and 15 and the handle-grips 16 and 17 and unite the tangs and handle-grips into the multi-ply handle 13, as is shown particularly in Figure 2.

The holes in the handles 16 and 17 may be counter-bored to receive the enlarged head of the rivets 18 and 19 to form a smooth and flush interconnection for the tangs and handlegrips.

Additional aligned holes in the tangs and handle-grips form the hook-receiving aperture 20 by which the utensil may be supported when not in use.

Furthermore, the handle-grips 16 and 17 may be beveled, as at 21, to provide a smooth handfitting handle-portion by which the utensil may be comfortably and easily grasped. The handlegrips 16 and 17 may be formed of a heat-insulating, colored plastic to provide an attractive and utilitarian handle.

The tangs 14 and 15 extend a short distance beyond the handle where they diverge, as at 22, to form the intermediate portions 23 and 24 of the yoke 12. Still further beyond the point of divergence 22 the outer ends 25 and 26 of the yoke 12 are bent toward each other terminating in generally parallel portions which are secured at their ends, as by riveting or welding or any other suitable manner, to the head 11.

The yoke 12 may be formed of sheet-metal to provide a light-weight but rigid interconnection between the handle 13 and the head 11.

The head 11 is formed from a flat piece of sheet-metal with a pair of up-turned ears 27 and 28 to which the ends of the yoke 12 are secured, as by the rivets 29. The ears 27 and 28 are formed from the body portion of the head-member leaving the apertures 30-a and 30-b, respectively, from which the metal was struck out.

The ends of the yoke 12 abut the surface 31 of the head 11 to provide a bearing surface and additional rigidity between the head 11 and the yoke 12.

In the head 11, a plurality of apertures 32, 33, 34, 35 and 36 are formed by removing generally arcuate strips of metal therefrom, leaving the webs 37, 38, 39 and 40 between the arcuate apertures.

Figure 5:
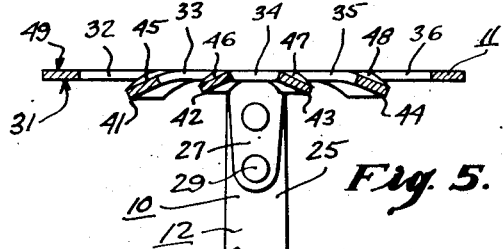
Figure 5 represents a cross-sectional view taken generally along line 5—5 of Figure 4.

The punch-and-die which blanks out the arcuate apertures may also twist the intervening webs 37, 38, 39 and 40, as is shown particularly in Figure 5. Thus, the punch-and-die strikes the webs 37, 38, 39 and 40 and raises the outer edges 41, 42, 43 and 44, respectively, to provide outwardly inclined camming surfaces 45, 46, 47 and 48.

These inclined camming surfaces 45, 46, 47 and 48 are adapted to contact the food to be creamed or mashed and spread the same radially outwardly toward the adjacent openings or apertures 32, 33, 35 and 36. In addition to the pulverizing action which takes place when the surface 49 of utensil of the present invention is brought forcefully against the food to be creamed, to force the food through the apertures 32, 33, 34, 35 and 36, pulverizing the same, the food contacted by the inclined surfaces 45, 46, 47 and 48 is spread toward the edges 41, 42, 43 and 44, respectively, and into the radially outwardly adjacent openings 32, 33, 35 and 36. The pulverizing action is also increased by forcing the food through the apertures 30–a and 30–b.

Thus, the utensil of the present invention does more than just pulverize the food by forcing it through restricted openings, for it contacts, mashes and spreads the food by and across the inclined surfaces 45, 46, 47 and 48 so as to provide a smoother, creamier product than heretofore available by the use of similar utensils.

It is to be understood that I do not mean to limit the configuration of the apertures 32, 33, 34, 35 and 36 to the arcuate slots shown in the drawings, but can use apertures of any suitable shape separated by narrow intervening inclined surfaces or webs which spread the food beneath the inclined surfaces toward the adjacent openings.

Moreover, by inclining the surfaces 45, 46, 47 and 48 radially outwardly (i. e., with the raised edge thereof being the outermost edge of the inclined surface), the creamed food is forced toward the periphery of the utensil of the present invention and thus is prevented from piling up on top of the utensil and is moved away from the edges of the head 11 to a position where it may be readily contacted by the surface 49 of the head 11, upon subsequent reciprocation of the utensil in the food-containing receptacle.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention, what I claim as new and desire to protect by Letters Patent, is the following:

1. A food creamer including a handle, a food-engaging head having a flat bottom surface, a yoke interconnecting said handle and said head, a central aperture in said head, a plurality of arcuate apertures disposed radially on each side of said central aperture, arcuate strips intervening said central and side apertures, said strips disposed at an angle to the plane of said head with the radially outer edge of each strip disposed in spaced relation to the plane of said head in the direction of said handle, no portion of said creamer extending below the plane of said head.

2. A food creamer including a handle, a food-engaging head having a flat bottom surface, a yoke interconnecting said handle and said head, a pair of yoke-engaging ears struck from and integrally connected to said head, a pair of end apertures in said head adjacent said ears, a generally central oval aperture in said head in alignment with and disposed between said end apertures, a plurality of arcuate apertures disposed radially on each side of said central aperture, arcuate strips intervening said central and side apertures, said strips being of uniform width and disposed at an angle to the plane of said head with the radially outer edge of each strip disposed in spaced relation to the plane of said head in the direction of said handle, no portion of said creamer extending below the plane of said head.

GEORGE M. JONES.

References Cited in the file of this patent

UNITED STATES PATENTS

| Number | Name | Date |
|---|---|---|
| 171,603 | Crane, Jr. | Dec. 28, 1875 |
| 303,022 | Kilborn | Aug. 5, 1884 |
| 719,467 | Holder | Feb. 3, 1903 |
| 920,484 | Marchand | May 4, 1909 |
| 1,111,356 | Boyle | Sept. 22, 1914 |
| 1,232,356 | Markee et al. | July 3, 1917 |
| 2,091,754 | Fedje | Aug. 31, 1937 |
| 2,575,978 | Scheidecker | Nov. 20, 1951 |

FOREIGN PATENTS

| Number | Country | Date |
|---|---|---|
| 82,225 | Switzerland | Sept. 22, 1919 |
| 155,075 | Switzerland | Aug. 16, 1932 |
| 389,557 | France | July 2, 1908 |
| 925,293 | France | Mar. 24, 1947 |